(12) United States Patent
Chen

(10) Patent No.: US 9,280,216 B2
(45) Date of Patent: Mar. 8, 2016

(54) WRITING DEVICE HAVING LIGHT EMITTING DIODE DISPLAY PANEL

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 354 days.

(21) Appl. No.: 14/051,467

(22) Filed: Oct. 11, 2013

(65) Prior Publication Data

US 2014/0176460 A1      Jun. 26, 2014

(30) Foreign Application Priority Data

Dec. 25, 2012   (TW) .............................. 101149897 A

(51) Int. Cl.
    *G06F 3/0354*    (2013.01)
    *G06F 3/041*     (2006.01)
    *G06F 3/042*     (2006.01)

(52) U.S. Cl.
    CPC ............ *G06F 3/03545* (2013.01); *G06F 3/042* (2013.01); *G06F 3/0412* (2013.01)

(58) Field of Classification Search
    CPC .... G06F 3/03545; G06F 3/0412; G06F 3/042
    See application file for complete search history.

(56) References Cited

U.S. PATENT DOCUMENTS

| 7,626,575 | B2* | 12/2009 | Cho ..................... | G06F 3/03545 345/173 |
| 7,847,789 | B2* | 12/2010 | Kolmykov-Zotov | G06F 3/03545 178/18.03 |
| 2006/0244693 | A1* | 11/2006 | Yamaguchi ......... | G02F 1/13338 345/76 |
| 2008/0100593 | A1* | 5/2008 | Skillman ................. | G06F 3/042 345/175 |

FOREIGN PATENT DOCUMENTS

WO    WO 2008/053425    *  5/2008  .......... G06F 3/03545

* cited by examiner

*Primary Examiner* — Koosha Sharifi-Tafreshi
*Assistant Examiner* — Chun-Nan Lin
(74) *Attorney, Agent, or Firm* — Novak Druce Connolly Bove + Quigg LLP

(57) ABSTRACT

A writing device includes a writing pen and a light emitting diode display panel. The writing pen emits three different-colored optical signals. The light emitting diode display panel includes a control module and a plurality of pixels. Each pixel includes first, second and third light sources, first, second and third light sensing elements, and a touch element. The first to third light sensing elements are configured to receive the three optical signals and generate first, second and third selective signals, respectively. The touch element generates a control signal when touched by the writing pen. According to the three selective signals and the control signal, the control module selectively turns on the first light source, the second light source, and the third light source.

16 Claims, 4 Drawing Sheets

WRITING DEVICE HAVING LIGHT EMITTING DIODE DISPLAY PANEL

BACKGROUND

1. Technical Field

The disclosure generally relates to writing devices, and particularly to an electronic blackboard having a light emitting diode display panel and a writing pen.

2. Description of Related Art

Conventionally, a plurality of information is chalked on a blackboard. A lot of dust is generated when writing the chalked information on or erasing the chalked information from the blackboard. The dust not only pollutes the environments, but also is harmful to human health.

What is needed, therefore, is a writing device having a light emitting diode display panel and a writing pen to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

An embodiment of a writing device will now be described in detail below and with reference to the drawings.

Figure 1:
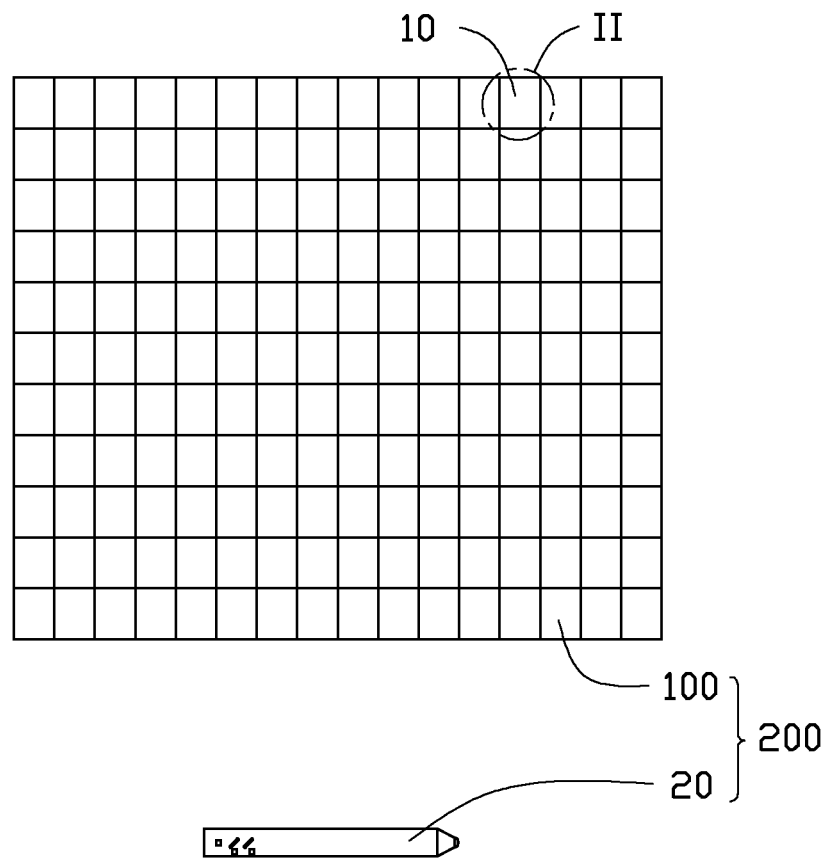
FIG. 1 is an illustrating view showing a writing device in accordance with an embodiment of the present disclosure.

Referring to FIG. 1, a writing device 200 in accordance with an embodiment is provided. The writing device 200 includes a light emitting display panel 100 and a writing pen 20 to write words/marks on the light emitting diode display panel 100.

Figure 2:
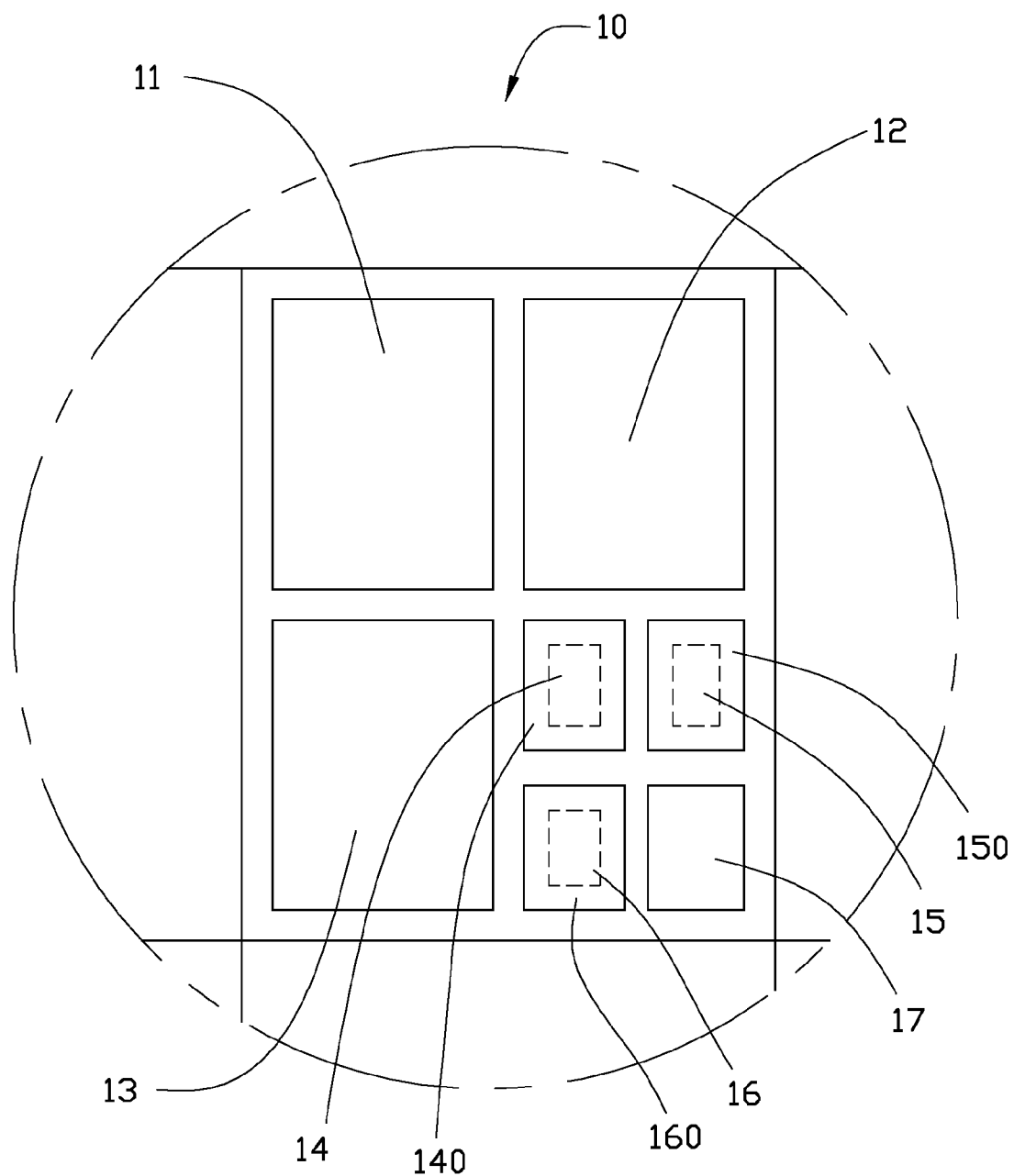
FIG. 2 is an enlarged view of a part II of the writing device in FIG. 1.
Figure 3:
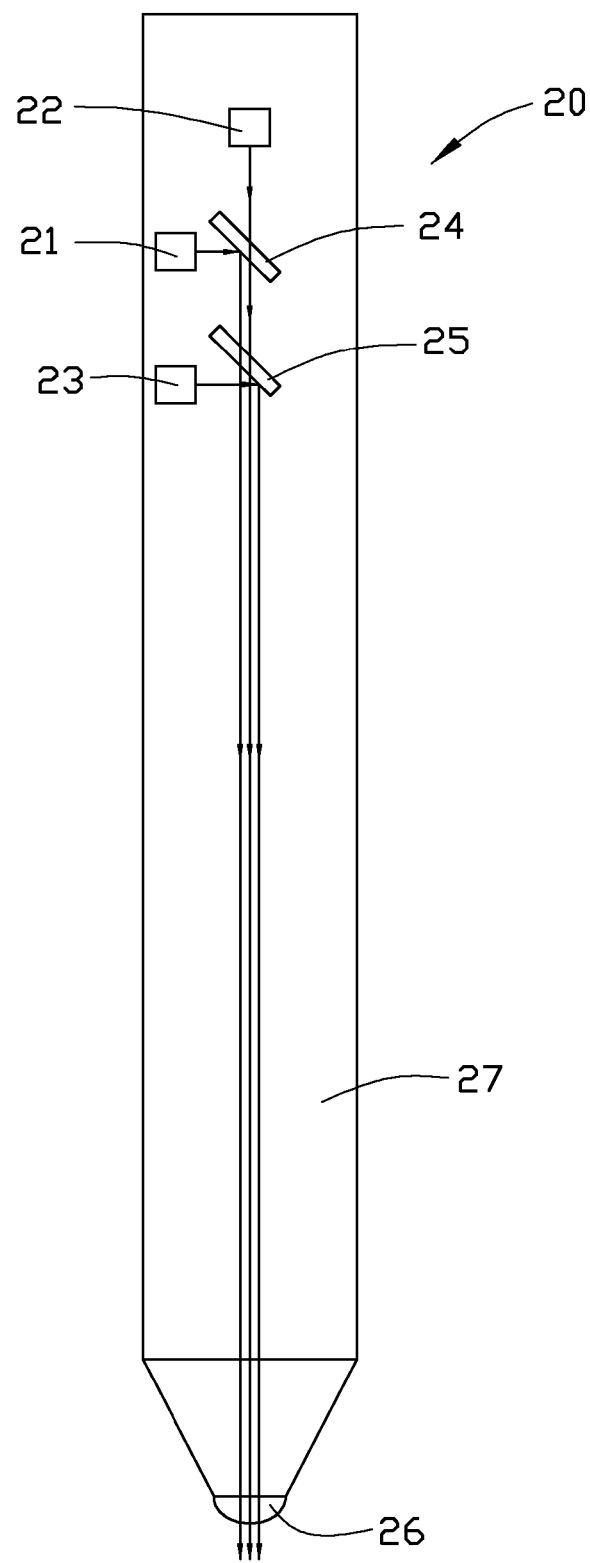
FIG. 3 is an enlarged view of a writing pen in FIG. 1.
Figure 4:
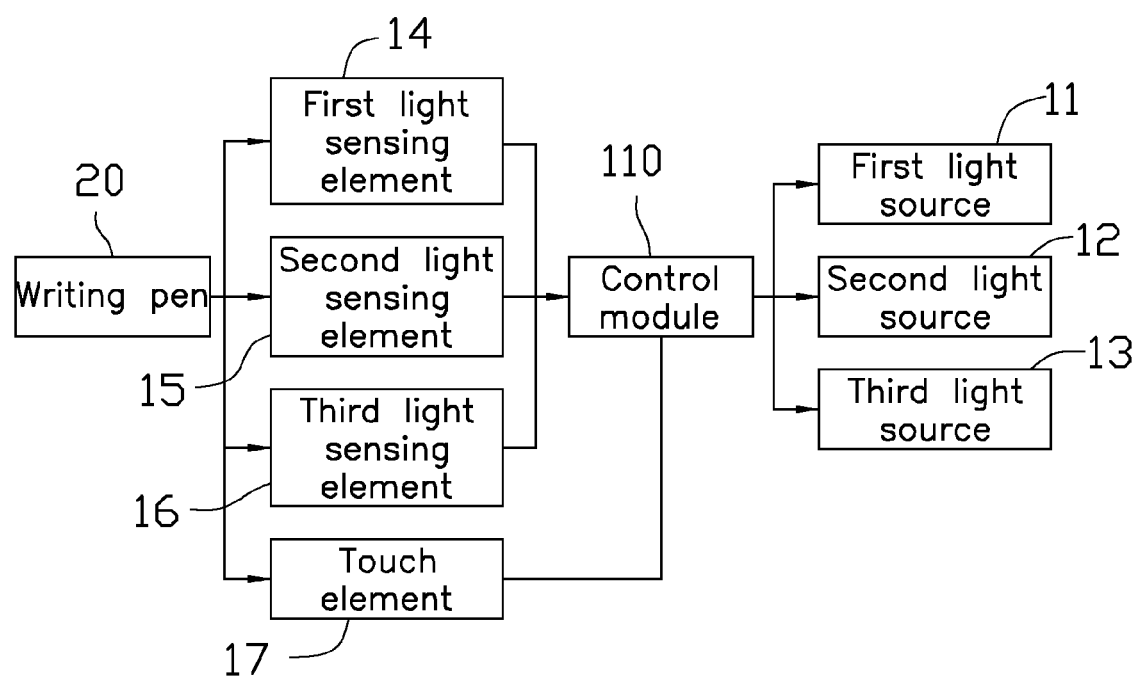
FIG. 4 is a block diagram showing the relationship between the elements of the writing device in FIG. 1.

Referring also to FIGS. 2-4, the light emitting display panel 100 includes a control module 110 and a plurality of pixels 10 arranged in a matrix. The number of the pixels 10 is determined by an area of the light emitting diode display panel 100. An increase of the number of the pixels 10 will improve a viewing quality of the light emitting diode display panel 100.

Each of the pixels 10 includes a first light source 11, a first light sensing element 14 and a touch element 17. In this embodiment, each of the pixels 10 further includes a second light source 12, a third light source 13, a second light sensing element 15, and a third light sensing element 16. The first light sensing element 14, the second light sensing element 15, the third light sensing element 16 and the touch element 17 are arranged in a matrix. The first light source 11, the second light source 12, the third light source 13, and a whole of the three light sensing elements 14, 15, 16 and the touch element 17 are also arranged in a matrix. In this embodiment, the first light source 11 emits red light, the second light source 12 emits green light and the third light source 13 emits blue light. The first light sensing element 14 is corresponding to the first light source 11. The second light sensing element 15 is corresponding to the second light source 12. The third light sensing element 16 is corresponding to the third light source 13. The first light sensing element 14 is configured to receive a first optical signal and generate a first selective signal to the control module 110. The second light sensing element 15 is configured to receive a second optical signal and generate a second selective signal to the control module 110. The third light sensing element 16 is configured to receive a third optical signal and generate a third selective signal to the control module 110. The touch element 17 is configured to receive a touch (pressure) signal and generate a control signal to the control module 110. According to the control signal, the first selective signal, the second selective signal and the third selective signal, the control module 110 selectively turns on one or more of the first light source 11, the second light source 12 and the third light source 13. When the three light sensing elements 14, 15 and 16 do not receive the optical signals, and only the touch element 17 receives the touch signal, the control module 110 will turn off the pixel 10.

The first light sensing element 14 is covered by a first light filter 140. The second light sensing element 15 is covered by a second light filter 150. The third light sensing element 16 is covered by a third light filter 160. In this embodiment, the first light filter 140 is a red filter, which only allows a red light to pass through. The second light filter 150 is a green filter, which only allows a green light to pass through. The third light filter 160 is a blue filter, which only allows a blue light to pass through.

The writing pen 20 includes a pen holder 27. An optical lens 26 is located at one end (front end) of the pen holder 27. A first lighting element 21, a second lighting element 22 and a third lighting element 23 are located at the other end (rear end) of the pen holder 27. The first lighting element 21 emits a red light. The second lighting element 22 emits a green light. The third lighting element 23 emits a blue light. The first lighting element 21, the second lighting element 22 and the third lighting element 23 are semiconductor lasers. The pen holder 27 further includes a first light guide element 24 and a second light guide element 25 to control a reflection and a transmission of lights with different colors. In this embodiment, the first light guide element 24 and the second light guide element 25 are located at a lighting path between the second lighting element 22 and the optical lens 26. The first light guide element 24 is adjacent to the second lighting element 22. The second light guide element 25 is adjacent to the optical lens 26. The first light guide element 24 is parallel to the second light guide element 25. An included angle is formed between the light from the second lighting element 22 and each of the two light guide element 24, 25, wherein the included angle is approximately 45 degrees. The first lighting element 21 is located at a left side of the first light guide element 24. Light from the first lighting element 21 is perpendicular to the light from the second lighting element 22. The first light guide element 24 reflects the light from the first lighting element 21 and makes the light from the first lighting element 21 parallel to the light from the second lighting element 22. Similarly, the third lighting element 23 is located at a left side of the second light guide element 25. Light from the third lighting element 23 is perpendicular to the light from the second lighting element 22. The second light guide element 25 reflects the light from the third lighting element 23 and makes the light from the third lighting element 23 parallel to the light from the second lighting element 22. The lights from the first lighting element 21, the second lighting element 22 and the third lighting element 23 are focused by the optical lens 26 before they emit out of the writing pen 20. The optical lens 26 is configured to touch the touch element 17. Preferably, the writing pen 20 can make one or more of the first lighting element 21, the second lighting element 22, and the third lighting element 23 emit light.

When the writing pen 20 writes words/marks on the light emitting diode display panel 100, the three light sensing elements 14, 15 and 16 of the pixels 10 receive optical signals from the writing pen 20 and generate selective signals to the control module 110. In addition, since each of the pixels 10 includes the first light source 11, the second light source 12 and the third light source 13, the pixels 10 can emit light with different colors. If all of the first lighting element 21, the second lighting element 22 and the third lighting element 23 do not emit light, the pixel 10 will be turned off when the touch element 17 of the pixel 10 is touched (pressed) by the optical lens 26 of the writing pen 20. The first light source 11, the second light source 12 and the third light source 13 do not generate any light and the pixel 10 appears black.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A writing device, comprising:
    a writing pen, comprising a pen holder and an optical lens located at one end of the pen holder, the writing pen being configured to emit a first optical signal of a first color, a second optical signal of a second color and a third optical signal of a third color;
    a light emitting diode display panel, comprising:
    a control module;
    a plurality of pixels arranged in a matrix, each pixel comprising a first light source for generating light of the first color, a second light source for generating light of the second color, a third light source for generating light of the third color, a first light sensing element, a second light sensing element, a third light sensing element and a touch element, the first light sensing element being configured to receive the first optical signal and generate a first selective signal, the second light sensing element being configured to receive the second optical signal and generate a second selective signal, the third light sensing element being configured to receive the third optical signal and generate a third selective signal, the touch element generating a control signal when touched by the writing pen, according to the first selective signal, the second selective signal, and the third selective signal, the control module selectively turning on the first light source, the second light source, and the third light source.

2. The writing device of claim 1, wherein the first color is red, the color green light, and the third color is blue.

3. The writing device of claim 2, wherein when receiving the first selective signal, the control module turns on the first light source to make a corresponding pixel emit red light when the touch element thereof is touched by the writing pen.

4. The writing device of claim 2, wherein when receiving the second selective signal, the control module turns on the second light source to make a corresponding pixel emit green light when the touch element thereof is touched by the writing pen.

5. The writing device of claim 2, wherein when receiving the third selective signal, the control module turns on the third light source to make a corresponding pixel emit blue light when the touch element is touched by the writing pen.

6. The writing device of claim 1, wherein each of the pixels further comprises a first light filter, a second light filter, and a third light filter, the first light filter covers on the first light sensing element and only allows the first optical signal to pass through, the second light filter covers on the second light sensing element and only allows the second optical signal to pass through, and the third light filter covers on the third light sensing element and only allows the third optical signal to pass through.

7. The writing device of claim 1, wherein the writing pen further comprises a first lighting element, a second lighting element, and a third lighting element, the first lighting element, the second lighting element and the third lighting element are all received in the pen holder, the first lighting element generates the first optical signal, the second lighting element generates the second optical signal, and the third lighting element generates the third optical signal.

8. The writing device of claim 7, wherein the second lighting element is located at the other end of the pen holder away from the optical lens, a first light guide element and a second light guide element are located between the second lighting element and the optical lens, the first lighting element is located beside the first light guide element, the third lighting element is located beside the second light guide element, light from the second lighting element passes through the first light guide element and the second light guide element and emits out of the writing pen from the optical lens, light from the first lighting element is reflected by the first light guide element and then passes through the second light guide element and emits out of the writing pen from the optical lens, light from the third lighting element is reflected by the second light guide element and emits out of the writing pen from the optical lens.

9. The writing device of claim 7, wherein the first light guide element is parallel to the second light guide element, an included angle between the light from the second lighting element and each of the two light guide elements is approximately 45 degrees.

10. A light emitting diode display panel, comprising:
    a control module;
    a plurality of pixels arranged in a matrix, each pixel comprising a first light source for generating light of first color, a second light source for generating light of second color, a third light source for generating light of third color, a first light sensing element, a second light sensing element, a third light sensing element, and a touch element, the first light sensing element being configured to receive a first optical signal and generate a first selective signal, the second light sensing element being configured to receive a second optical signal and generate a second selective signal, the third light sensing element being configured to receive a third optical signal and generate a third selective signal, the touch element generating a control signal when touched by a writing pen, according to the first selective signal, the second selective signal, and the third selective signal, the control module selectively turning on the first light source, the second light source, and the third light source.

11. The light emitting diode display panel of claim 10, wherein the first light source emits red light, the second light source emits green light, and the third light source emits blue light.

12. The light emitting diode display panel of claim 11, wherein when receiving the first selective signal, the control module turns on the first light source to make a corresponding pixel emit red light when the touch element thereof is touched by the writing pen.

13. The light emitting diode display panel of claim 11, wherein when receiving the second selective signal, the control module turns on the second light source to make a corresponding pixel emit green light when the touch element thereof is touched by the writing pen.

14. The light emitting diode display panel of claim 11, wherein when receiving the third selective signal, the control module turns on the third light source to make a corresponding pixel emit blue light when the touch element thereof is touched by the writing pen.

15. The light emitting diode display panel of claim 10, wherein each of the pixels further comprises a first light filter, a second light filter, and a third light filter, the first light filter covers on the first light sensing element and only allows the first optical signal to pass through, the second light filter covers on the second light sensing element and only allows the second optical signal to pass through, and the third light filter covers on the third light sensing element and only allows the third optical signal to pass through.

16. The light emitting diode display panel of claim 10, wherein when the touch element of a corresponding pixel is pressed by the writing pen and the first light sensing element, the second light sensing element and the third light sensing element receive none of the first optical signal, the second optical signal and the third optical signal, none of the first light source, the second light source and the third light source generate light and the corresponding pixel appears black.

* * * * *